(12) United States Patent
Fortuna et al.

(10) Patent No.: US 11,724,198 B2
(45) Date of Patent: Aug. 15, 2023

(54) INTELLIGENT RECOMMENDATIONS FOR GAMEPLAY SESSION ADJUSTMENT

(71) Applicant: Sony Interactive Entertainment LLC, San Mateo, CA (US)

(72) Inventors: Ellana Fortuna, San Mateo, CA (US); Erikka Thompson, San Mateo, CA (US); Elizabeth Juenger, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 17/399,773

(22) Filed: Aug. 11, 2021

(65) Prior Publication Data
US 2023/0047065 A1    Feb. 16, 2023

(51) Int. Cl.
*A63F 13/75* (2014.01)
*A63F 13/71* (2014.01)
*A63F 13/79* (2014.01)
*A63F 13/85* (2014.01)

(52) U.S. Cl.
CPC .............. *A63F 13/75* (2014.09); *A63F 13/71* (2014.09); *A63F 13/79* (2014.09); *A63F 13/85* (2014.09)

(58) Field of Classification Search
None
See application file for complete search history.

(56) References Cited

U.S. PATENT DOCUMENTS

| | | |
|---|---|---|
| 8,437,771 B1 | 5/2013 | Coverstone |
| 10,361,802 B1 | 7/2019 | Hoffberg-Borghesani et al. |
| 2007/0053513 A1 | 3/2007 | Hoffberg |
| 2007/0157220 A1 | 7/2007 | Cordray et al. |
| 2008/0096663 A1* | 4/2008 | Lieberman .............. A63F 13/75 463/42 |

(Continued)

FOREIGN PATENT DOCUMENTS

| | | |
|---|---|---|
| CN | 115705385 | 2/2023 |
| CN | 115706834 | 2/2023 |

(Continued)

OTHER PUBLICATIONS

U.S. Appl. No. 17/403,269 Office Action dated Jun. 7, 2022.

(Continued)

*Primary Examiner* — Jason T Yen
(74) *Attorney, Agent, or Firm* — Polsinelli LLP

(57) ABSTRACT

Systems and methods for monitoring gameplay for monitoring real-time gameplay object data that is used to extract patterns in gameplay for generating notifications regarding control options based on extracted patterns. The notifications may indicate that selected conditions may be met based on the activity data that may be analyzed based on learning models associated with the selected conditions. The learning models may include models regarding player behavior, such as bullying or harassing language. The extract patterns may include gameplay session length, type of game played, and in-game behavior. Supervising accounts may receive recorded media segments associated with the activity data that met the selected conditions. And the user accounts engaging in such activities may be blocked and/or provided suggestions regarding alternative activities.

19 Claims, 5 Drawing Sheets

(56) References Cited

U.S. PATENT DOCUMENTS

| | | | |
|---|---|---|---|
| 2009/0174702 A1* | 7/2009 | Garbow | A63F 13/12 345/419 |
| 2009/0217342 A1 | 8/2009 | Nadler | |
| 2010/0081508 A1* | 4/2010 | Bhogal | A63F 13/79 463/40 |
| 2011/0072452 A1 | 3/2011 | Shimy et al. | |
| 2011/0183754 A1 | 7/2011 | Alghamdi | |
| 2011/0258049 A1 | 10/2011 | Ramer et al. | |
| 2012/0278179 A1 | 11/2012 | Campbell et al. | |
| 2013/0031601 A1 | 1/2013 | Bott | |
| 2013/0061260 A1 | 3/2013 | Maskatia et al. | |
| 2014/0329589 A1 | 11/2014 | Hawver | |
| 2015/0281793 A1 | 10/2015 | Wheatley et al. | |
| 2015/0312609 A1 | 10/2015 | Hoctor et al. | |
| 2016/0225278 A1 | 8/2016 | Leddy | |
| 2016/0300388 A1 | 10/2016 | Stafford et al. | |
| 2016/0373891 A1 | 12/2016 | Ramer et al. | |
| 2017/0201779 A1 | 7/2017 | Publicover | |
| 2017/0225079 A1 | 8/2017 | Conti et al. | |
| 2018/0256981 A1* | 9/2018 | Enomoto | A63F 13/67 |
| 2018/0352302 A1 | 12/2018 | Roe et al. | |
| 2019/0022533 A1 | 1/2019 | Asanuma et al. | |
| 2019/0052471 A1 | 2/2019 | Panattoni et al. | |
| 2019/0058958 A1 | 2/2019 | Proctor et al. | |
| 2019/0082229 A1 | 3/2019 | Grumer et al. | |
| 2019/0270007 A1 | 9/2019 | Stine et al. | |
| 2019/0270021 A1* | 9/2019 | Hume | A63F 13/87 |
| 2019/0347675 A1 | 11/2019 | Yang et al. | |
| 2019/0349619 A1 | 11/2019 | Hou | |
| 2021/0234866 A1 | 7/2021 | Michalowitz et al. | |
| 2021/0370183 A1* | 12/2021 | Dorn | A63F 13/79 |
| 2022/0008830 A1* | 1/2022 | Valencia | A63F 13/79 |
| 2023/0051771 A1 | 2/2023 | Fortuna | |

FOREIGN PATENT DOCUMENTS

| | | |
|---|---|---|
| EP | 3 533 505 | 9/2019 |
| EP | 4 134 144 | 2/2023 |
| EP | 4 137 979 | 2/2023 |

OTHER PUBLICATIONS

European Application No. 22188602.1 Extended European Search Report dated Dec. 16, 2022.

U.S. Appl. No. 17/403,269 Final Office Action dated Dec. 8, 2022.

European Application No. 22188602.1 Extended European Search Report dated Jan. 4, 2023.

* cited by examiner

| Object | Events |
|---|---|
| Activity | activityAvailabilityChange (id[])<br>activityStart (id,location)<br>activityEnd(id,outcome,location) |
| Zone | locationChange (id,location) |
| Actor | actorSelect (id[]) |
| Mechanic | mechanicAvailabilityChange (id[])<br>mechanicInventoryChange (id[])<br>mechanicLoadoutChange (id[])<br>mechanicUse (id[],)<br>mechanicImpact (id) |
| Game Media | gameMediaUnlock (id)<br>gameMediaStart (id)<br>gameMediaEnd (id) |

FIG. 3 ations or notifications for different patterns of behavior in gameplay, there is a need in the art for improved systems and methods for developing and customizing learning models regarding gameplay by a player.

INTELLIGENT RECOMMENDATIONS FOR GAMEPLAY SESSION ADJUSTMENT

BACKGROUND OF THE INVENTION

1. Field of the Invention

The present technology pertains to analyzing gameplay of interactive content titles. More specifically, the present technology pertains to developing and customizing learning models regarding gameplay by a player.

2. Description of the Related Art

Players may develop behavioral patterns in virtual environments that affect not only their own experience, but other players as well (e.g., during multi-player gameplay sessions). Such patterns may relate to and impact physical health, mental and emotional health, and social interactions. For example, players that engage in extremely extended periods of gameplay may spend that time indoors in relatively sedentary and inactive states while overlooking mealtimes, physical exercise, and other healthy behaviors. Other patterns that may be detrimental may relate to social interactions or lack thereof, such as long periods of antisocial gameplay, bullying, harassment, aggressive or threatening behavior, etc. Even players that are otherwise healthy may nevertheless fall into ruts in relation to gameplay. The lack of diversification may therefore result in poor gameplay experiences.

Present gaming platforms may provide some simple settings, such as settings that limit gameplay time. Such settings are generally not tailored, however, to different specific behaviors, and the one-size-fits-all approach of applying simple limits may end up being ineffective at curbing or otherwise disrupting undesirable behavior patterns. Presently available systems therefore lack the ability to identify such behavior patterns as they emerge, as well as lack the ability to address an emerging pattern in a manner corresponding to the specific circumstances and conditions under which the pattern emerged.

Moreover, players may come from different demographics (as do their respective parent(s), guardian(s), caretaker(s), or other type of supervisor(s), etc.). Each individual player (and supervisor) may further exhibit unique habits, idiosyncrasies, and preferences in relation to gameplay. Thus, a one-size-fits-all approach to gameplay analysis and adjustments cannot take such individual characteristics into account.

Therefore, to provide a more tailored set of recommendations or notifications for different patterns of behavior in gameplay, there is a need in the art for improved systems and methods for developing and customizing learning models regarding gameplay by a player.

SUMMARY OF THE CLAIMED INVENTION

Disclosed are systems, apparatuses, methods, computer readable medium, and circuits for developing and customizing learning models regarding gameplay by a player. According to at least one example, a method includes: storing information in memory regarding a user account and one or more selected conditions; monitoring activity data from a plurality of gameplay sessions of a plurality of interactive content titles, the activity data associated with the user account; analyzing the activity data to extract patterns in gameplay by the user account associated with the selected conditions, wherein analyzing the activity data is based on one or more learning models associated with the selected conditions; generating a notification that includes one or more recommendations regarding gameplay control options based on the extracted patterns indicating that one or more of the selected conditions are met by the activity data. For example, the monitoring server of a networking environment stores information in memory regarding a user account and one or more selected conditions; monitors activity data from a plurality of gameplay sessions of a plurality of interactive content titles, the activity data associated with the user account; analyzes the activity data to extract patterns in gameplay by the user account associated with the selected conditions, wherein analyzing the activity data is based on one or more learning models associated with the selected conditions; generates a notification that includes one or more recommendations regarding gameplay control options based on the extracted patterns indicating that one or more of the selected conditions are met by the activity data.

In another example, a monitoring server of a networking environment for developing and customizing learning models regarding gameplay by a player may be provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the monitoring server of a networking environment to: store information in memory regarding a user account and one or more selected conditions; monitor activity data from a plurality of gameplay sessions of a plurality of interactive content titles, the activity data associated with the user account; analyze the activity data to extract patterns in gameplay by the user account associated with the selected conditions, wherein analyzing the activity data is based on one or more learning models associated with the selected conditions; generate a notification that includes one or more recommendations regarding gameplay control options based on the extracted patterns indicating that one or more of the selected conditions are met by the activity data.

BRIEF DESCRIPTION OF THE DRAWINGS

FIG. 3 illustrates an exemplary table of various objects and associated events.

DETAILED DESCRIPTION

Aspects of the present disclosure include systems and methods for developing and customizing learning models regarding gameplay by a player. The notifications may be provided that indicate that selected conditions may be met based on the activity data and that learning models associated with the selected conditions may be applied to discern behavioral patterns. The learning models may include models regarding different types of player behavior, such as bullying or harassing language. The extract patterns may include gameplay session length, type of game played, and in-game behavior. Supervising accounts may receive recorded media segments associated with the activity data that met the selected conditions. The supervising account may further be provided with options for addressing the user accounts engaging in such activities, whether by blocking such user accounts from interacting with the supervised player, throttling gameplay with such user accounts, automatically recording interactions between the user accounts and the supervised player account, and/or making suggestions regarding alternative activities to the supervised player account.

Figure 1:
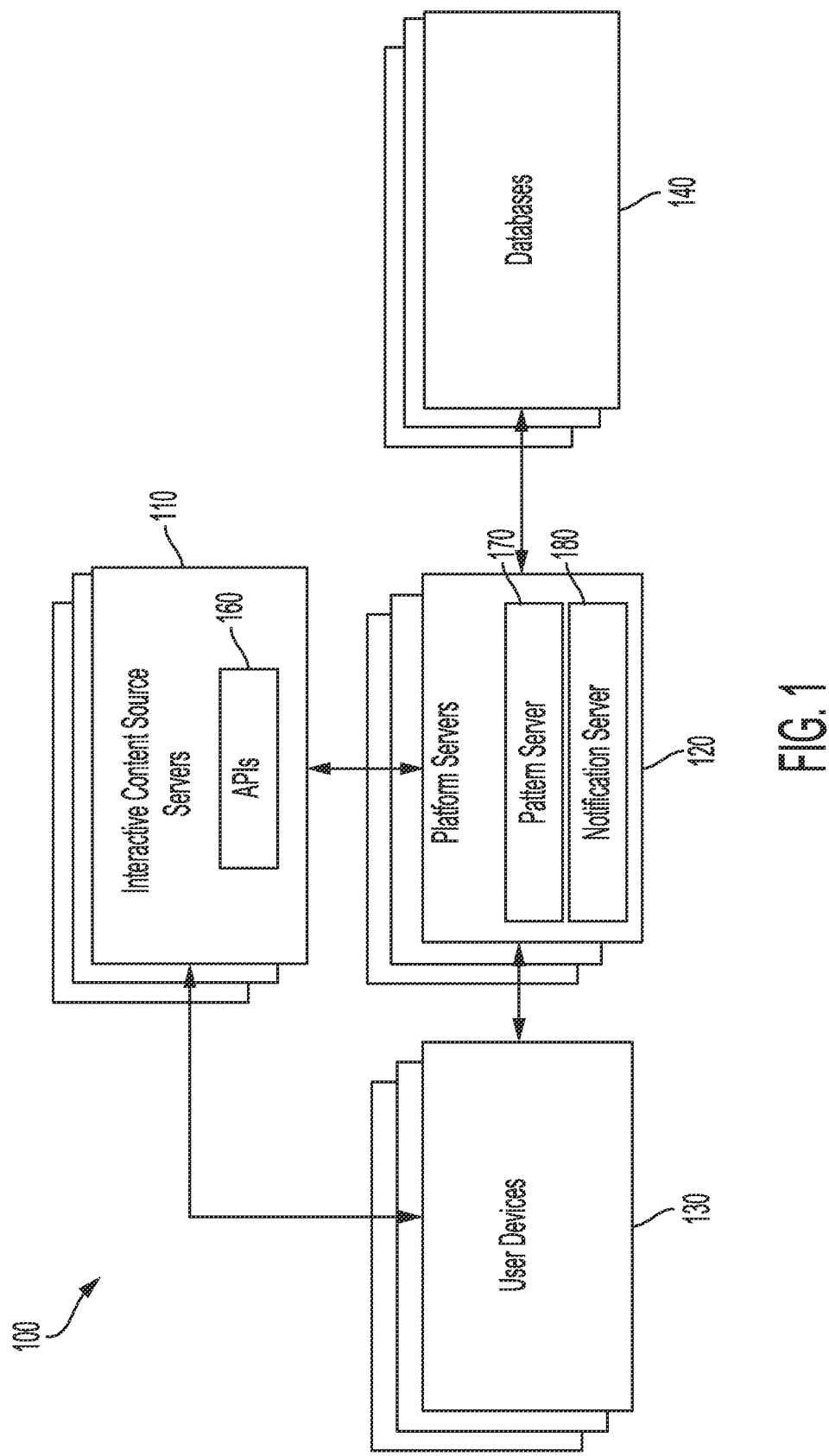
FIG. 1 illustrates an exemplary network environment in which system for developing and customizing learning models regarding gameplay by a player may be implemented.

FIG. 1 illustrates an exemplary network environment 100 in which a system for developing and customizing learning models regarding gameplay by a player may be implemented. The network environment 100 may include one or more interactive content source servers 110 that provide streaming content (e.g., interactive content titles, game titles, interactive video, podcasts, etc.), one or more platform servers 120, one or more user devices 130, and one or more databases 140.

Interactive content source servers 110 (inclusive of game servers) may maintain, stream, and host interactive media available to stream on a user device 130 over a communication network. Such interactive content source servers 110 may be implemented in the cloud (e.g., one or more cloud servers). Each media may include one or more sets of object data that may be available for participation with (e.g., viewing or interacting with an activity) by a user. Data about the object shown in the media may be stored by the interactive content servers 110, platform servers 120 and/or the user device 130, in an object file 216 ("object file"), as will be discussed in detail with respect to FIGS. 2 and 3.

The platform servers 120 may be responsible for communicating with the different interactive content source servers 110, databases 140, and user devices 130. Such platform servers 120 may be implemented on one or more cloud servers. The platform servers 120 may include a pattern server 170 operating in conjunction a notification server 120 to develop and customize learning models regarding gameplay by individual players.

In an exemplary embodiment, gameplay data may be provided by interactive content source servers 110 and/or the user device 130 of a specific player regarding a current gameplay session. The gameplay data may be inclusive of object data, which may be inclusive of activity data regarding in-game actions taken by an avatar of the player in relation to the virtual environment and virtual elements and objects therein. The pattern server 170 may be configured to analyze the activity data to extract patterns in gameplay by the user account. For example, gameplay patterns may identify that the player tends to perform specific types of actions under certain conditions.

In some embodiments, pattern server 170 may also access historical gameplay data from databases 140 to order to identify gameplay patterns. Such historical data may be associated with the specific player or may be associated with other players having similar characteristics as indicated in a player profile or other player data. In further embodiments, pattern server 170 may also access and evaluate one or more learning models associated with the selected conditions and identify whether such learning models may be applicable to the conditions of the current gameplay session. Similar learning models (that include patterns matching the gameplay data and conditions of the current gameplay session). While learning models associated with other similarly situated players may be useful for analyzing the player of the current gameplay session, pattern server 170 may further use unique data regarding the player of the current gameplay session to customize a learning model. For example, where gameplay data for the player exhibits a divergence from learning models that had been identified as similar, the learning model for the player may be customized to include the specific divergent behavioral pattern.

The learning model for the player may further be refined as the player continues to play more games and generate more gameplay data from which new and different behavioral patterns may begin to emerge. Such a customized learning models may therefore include a variety of different behavioral patterns characterizing gameplay of a specific player under different combinations of conditions, including different game titles, game genres, gameplay mode (e.g., individual, team-based), different peer players (e.g., competitors or teammates), and different in-game virtual environments and elements thereof. Meanwhile, the gameplay data may include types of activities engaged by the player, length of gameplay, achievements in gameplay, interaction with peers in the virtual environment, etc.

The learning model for the player may also include data regarding different actions that may be recommended when certain behavioral patterns emerge. For example, when an identified behavioral pattern indicates that a player's performance is beginning to deteriorate during an extended gameplay session, the learning model may associate such pattern with actions involving notifying the player to take a break from gameplay, notifying a designated supervisor account, throttling gameplay time, or other action. The notifications may be generated and provided by a notification server 180 that sends or otherwise provides notifications to either the user device 130 of the player engaged in the gameplay session or another user device 130 associated with the supervising user account. The pattern server 170 may include the notification server 180 or may be separate from the notification server 180.

With respect to the supervising account, the notification server 180 may send notifications to the supervising account associated with recommendations regarding the gameplay control options to a user device associated with a user account. When the supervising account opts to implement a gameplay control option, such as to require activity diversification, the notification server 180 may suggest one or more alternative activities that are currently available to the user account. In addition, the user account may be blocked from engaging in a current activity for a predetermine period of time based on the gameplay control option implemented by the supervising user account. Other gameplay control options may include throttling game time or flagging in-game behaviors that meet certain selected conditions, such as by the supervising user account or the platform servers 120 based on certain extracted patterns.

Pattern server 170 may continue to track gameplay data (which may be added to historical data stored in databases 140), as well as subsequent control data by supervisor account and other player data to determine whether the actions taken in response to the identified patterns insights resulted in a satisfactory outcome. Such analysis may further be used to refine the learning model for the specific player, which may result in a different action taken in a subsequent gameplay session associated with similar conditions. Different learning models may be developed, customized, and further refined for different individual players in real-time as gameplay continues to be ongoing. Pattern server 170 may therefore also continue to monitor the different learning models to identify similar behavior patterns, behavior patterns that begin to diverge or converge, and associated actions and outcomes thereof. Such analyses may also be used to further customize learning models for a player, so that more tailored actions and recommendations may be made.

The interactive content source servers 110 may communicate with multiple platform servers 120, though the interactive content source servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of interactive content source servers 110 to communicate with different platform servers 120 and different user devices 130. API 160 may be specific to the particular computer programming language, operating system, protocols, etc., of the interactive content source servers 110 providing the streaming media content titles, the platform servers 120 providing the media and the associated at least one set of object data, and user devices 130 receiving the same. In a network environment 100 that includes multiple different types of interactive content source servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 5.

The databases 140 may be stored on the platform server 120, the interactive content source servers 110, any of the servers 218 (examples shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game avatars, etc.) and may be associated to media.

Figure 2:
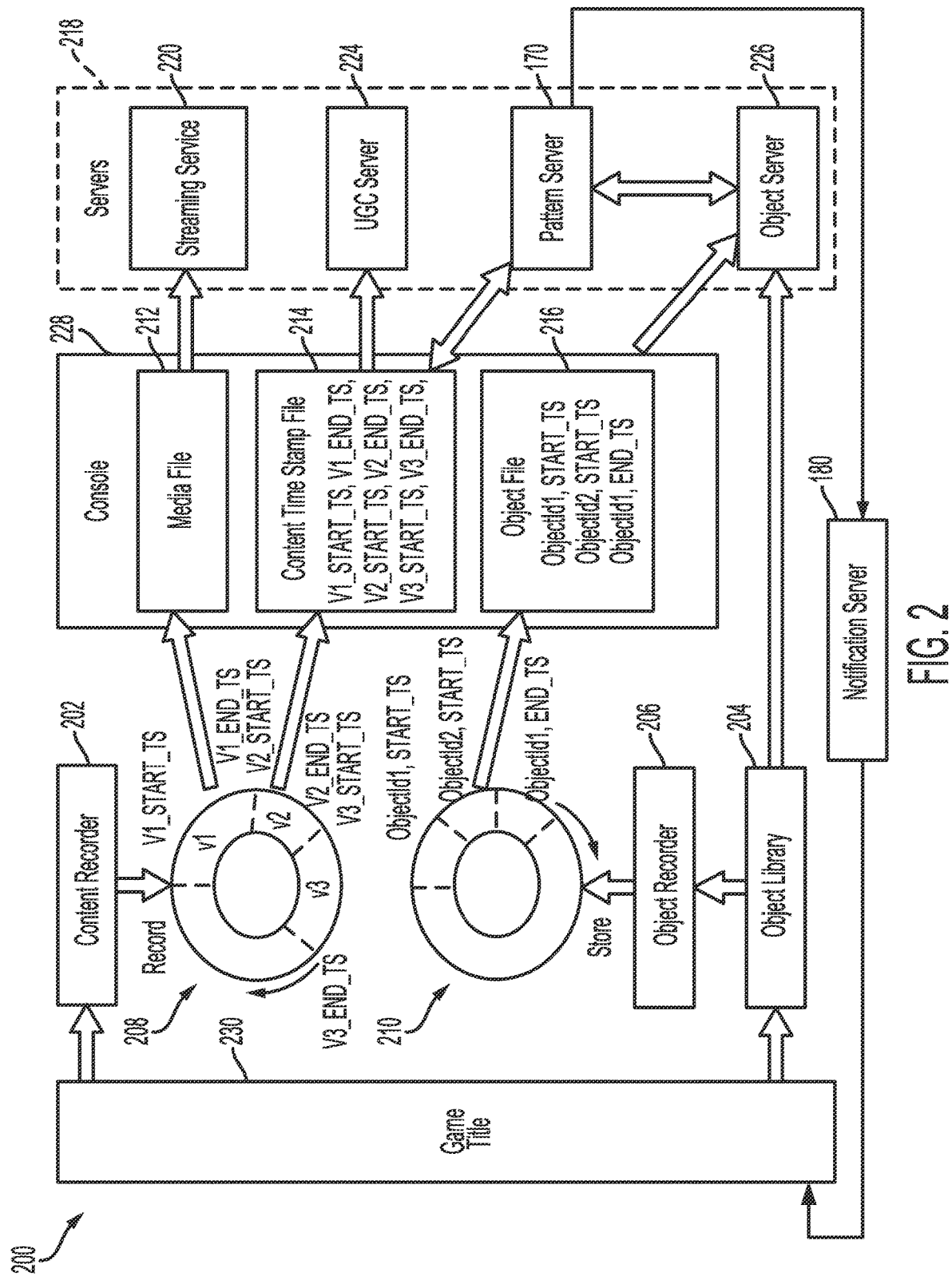
FIG. 2 illustrates an exemplary UDS system that monitors for real-time gameplay object data that is used for developing and customizing learning models regarding gameplay by a player.

FIG. 2 illustrates an exemplary UDS system 200 that monitors for real-time gameplay object data that is used to extract patterns in gameplay. As illustrated in FIG. 2, a console 228 and servers 218 (e.g., a streaming server 220, a UGC server 224, and a pattern server 170, and an object server 226) are shown to receive object data and media files recorded by the object recorder 206 and the content recorder 202, respectively.

The console 228 may be implemented on the platform server 120, a cloud server, or on any of the servers 218. The console 228 may further includes a content recorder 202 and an object recorder 210, described in more detail below, where content (e.g., media) may be recorded and outputted through the console 228. The game titles 230 may be executed on the console 228. Alternatively, or in addition to, the content recorder 202 may be implemented on the platform server 120, a cloud server, or on any of the servers 218.

Such content recorder 202 may receive and record content (e.g., media) from an interactive content title 230 (e.g., game servers 110) onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the UGC server 224, though the content time stamp file 214 may be stored on any server, a cloud server, any console 228, or any user device 130.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 120, a cloud server, or on any of the servers 218. When the object recorder 206 detects an object beginning, the object recorder 206 receives object data (e.g., user interaction with the object, object ID, object start times, object end times, object results, object types, etc.) from the object library 204 and records the object data onto an object ring-buffer 208 (e.g., ObjectID1, START_TS; ObjectID2, START_TS; ObjectID3, START_TS). Such object data recorded onto the object ring-buffer 208 may be stored in an object file 216.

Such object file 216 may also include object start times, object end times, an object ID, object results, object types (e.g., competitive match, quest, task, etc.), user or peer data related to the object. For example, an object file 216 may store data regarding an activity, an in-game item, a zone, an actor, a mechanic, a game media, as will be discussed in detail with respect to FIG. 3. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 226 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 224 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 224, though the association may be performed by any server, a cloud server, any console 228, or any user device 130. In another example, an object file 216 and a content time stamp file 214 may be associated by the console 228 during creation of each file 214, 216.

The pattern server 170 may receive real-time object data from the object server 226 to monitor and analyze activity data associated with user accounts. The object data, which will be described in more detail below, may provide insights as to what is currently occurring during gameplay. The databases 140 may store information regarding a user account and one or more selected conditions. The pattern server 170 may monitor activity data associated with a user account. The activity data may be received based on a plurality of gameplay sessions of a plurality of interactive content titles. The activity data may further be analyzed to extract patterns in gameplay by the user account associated with the selected conditions.

The activity data may be analyzed based on one or more learning models associated with the selected conditions. The learning models may include AI learning models that intelligently assess communications between players to identify bullying and harassing language based on inputs and historical flags and natural language processing. For example, the learning models may determine levels of discomfort from other players based on behaviors within game environments, such as characters associated with other players leaving conversations or avoiding a certain character and forming patterns associated with what the player is communicating that may cause such reactions.

If and when appropriate, a notification may be generated and/or sent via a notification server 180. The notification may include one or more recommendations regarding gameplay control options based on the extracted patterns indicating that one or more of the selected conditions are met by the activity data. For example, the gameplay control options may be associated with throttling game time, requiring activity diversification, or flagging in-game behaviors that meet the selected conditions.

The pattern server 170 may further receive content time stamp files 214 for determining relevant media files 212 that may be appropriate to send to the supervising account as context for flagged in-game behavior by the player in gameplay sessions. For example, when the player is given three chances by a selected condition before the supervising user account is notified, once the three chances have been reached, the supervising user account may receive recording of media segments of the gameplay session of the player engaging in questionable behavior. The recorded media segments may be recorded based on one or more timestamps associated with the activity data as recorded by the content recorder 202 and Another example may include the supervising user account such setting a schedule or calendar that sets different gameplay control modes for the user account based on the designated schedule or calendar. The patterns of gameplay, which may be associated with the length of the gameplay sessions or the type of game played may control the different gameplay control modes offered to the user account. For instance, if the user account is playing more educational games or has been improving in their social interactions, the designated schedule or calendar may reward more gameplay time or offer more types of game titles to the user account.

The pattern server 170 may also block the user account from engaging in a current activity for a predetermined period of time. The pattern server 170 may further provide suggestions regarding one or more alternative activities that are currently available to the user account. Available alternative activities may be set by the supervising user account and/or the platform servers 120 to be limited to only approved interactive content titles.

FIG. 3 illustrates an exemplary table of various objects and associated events. As shown in the example table 300 of FIG. 3, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be activity data 302, zone data 304, actor data 306, mechanics data 308, game media data 310, and other gameplay-related data.

Such object data (e.g., the object file 216) may be categorized as in in progress, open-ended, or competitive. Such activity data 302 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data 302 may include an activity availability change event for, which may indicate a list or array of currently available activities for the player. For example, this may be used to decide what activities to display in a game plan.

Such zone data 304 may indicate an area of an associated game world with a single coordinate system wherein the zone may have a 2-D map associated with it and may be used to display locations on the zone. If zone data 304 are applicable, each zone may include a zone ID and a short localizable name of the Zone. Such zone data 304 may be associated with a view projection matrix (4×4) to convert from 3-D world coordinates to a 2-D map position. Such zone data 304 may be associated with a location change event that indicates an update to a current in-game location of the player. Such location change event may be posted regularly, or whenever the player's in-game location changes significantly. The platform server 120 may store a latest value in 'state.' Such zone data 304 may include an x, y, z position of the player's avatar in the zone as well as an a, b, c vector indicating the player's avatars orientation or direction. Such zone data 304 may be associate with an activity start event and/or an activity end event and for the activity end event, an outcome of completed, failed, or abandoned may be associated to the activity (e.g., activity ID).

Such actor data 306 may be associated with an entity with behaviors in the game and can be player-controller or game-controlled, and can change dynamically during gameplay. Such actor data 306 may include an actor ID for the actor, a localizable name for the actor, an image of the actor, and/or a short description of the actor. Such actor data 306 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data 308 may be associated with an item, skill, or effect that can be used by the player or the game to impact gameplay (e.g., bow, arrow, stealth attack, fire damage) and may exclude items that do no impact gameplay (e.g., collectibles). Such mechanics data 308 may include a mechanic ID of the mechanic, a short name of the mechanic, an image of the mechanic, and/or a short description of the mechanic. Such mechanics data 308 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data 308 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data 308 may be associated with a mechanic use event that indicates that a mechanic has been used by or against the player and may be used to be displayed as mechanic usage in a UGC context. Such mechanics data 308 may include a list or array of mechanics that were used (e.g., fire arrow, fire damage) or whether an initiator is the player, such that whether the mechanics were used by or against the player. Such mechanics data 308 may include an initiator actor ID, a current zone ID of the initiator actor, and/or a current x, y, z position of the initiator actor. Such mechanics data 308 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data 308 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data 310 may include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data 310 may be associated with a game media start event that indicates that a particular piece of game media has started in the game right now and a game media end event that indicates that the particular piece of game media has ended.

Figure 4:
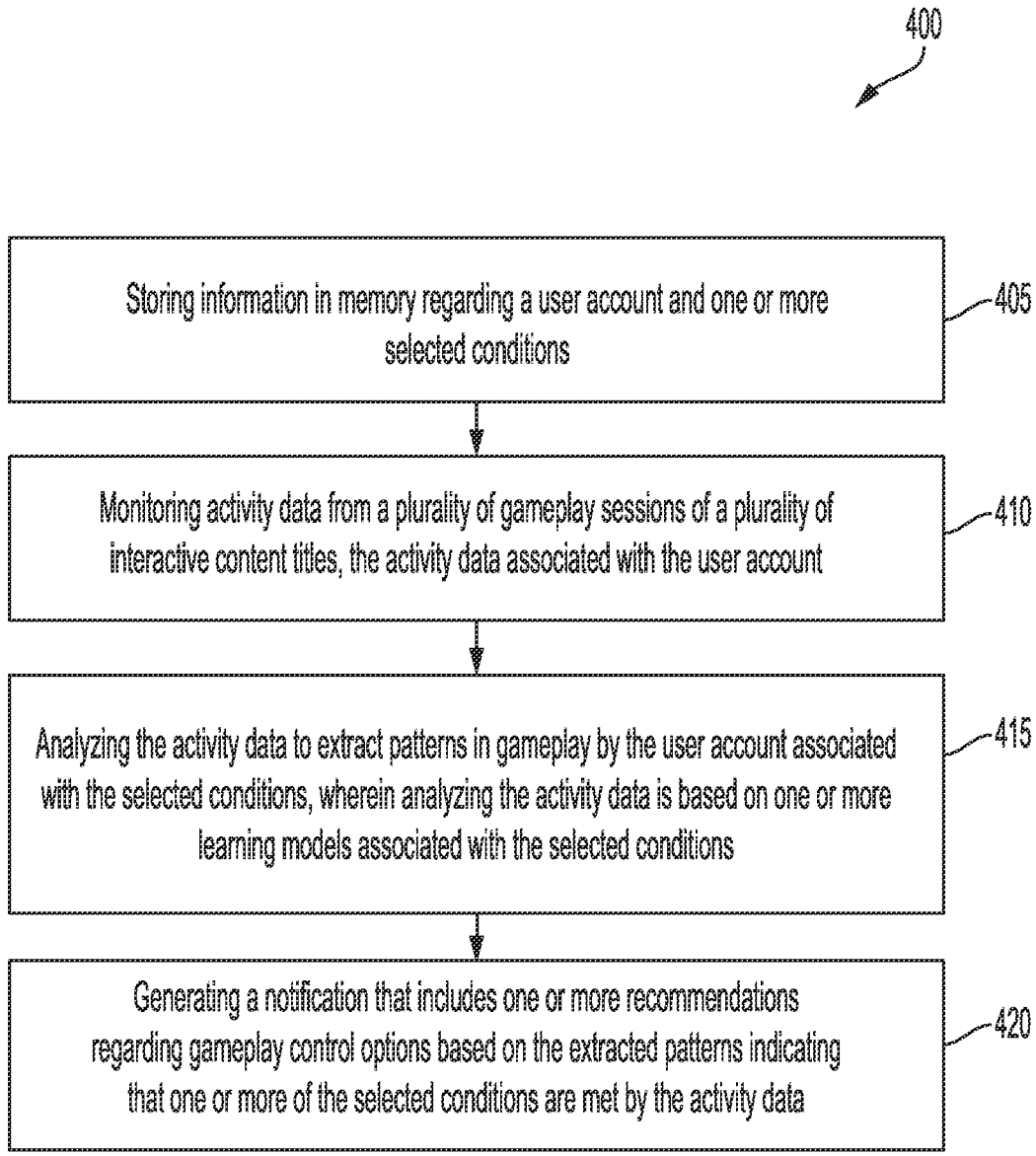
FIG. 4 is a flowchart of an exemplary method for developing and customizing learning models regarding gameplay by a player.

FIG. 4 is a flowchart of an exemplary method 400 for evaluating in-game actions of players by monitoring real-time gameplay object data, extracting patterns in the gameplay data, and generating notifications regarding control options based on the extracted patterns. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes storing information in memory regarding a user account and one or more selected conditions at step 405. For example, the databases 140 illustrated in FIG. 1 may store information in memory regarding a user account and one or more selected conditions.

According to some examples, the method includes monitoring activity data from a plurality of gameplay sessions of a plurality of interactive content titles, the activity data associated with the user account at step 410. For example, the pattern server 170 illustrated in FIGS. 1 and 2 may monitor activity data from a plurality of gameplay sessions of a plurality of interactive content titles, the activity data associated with the user account.

According to some examples, the method includes analyzing the activity data to extract patterns in gameplay by the user account associated with the selected conditions at step 415. For example, the pattern server 170 illustrated in FIGS. 1 and 2 may analyze the activity data to extract patterns in gameplay by the user account associated with the selected conditions. In some examples, the one or more learning models include models regarding player behavior including bullying or harassing language. In some examples, analyzing the activity data is based on one or more learning models associated with the selected conditions. In some examples, the extracted patterns are associated with at least one of gameplay session length, type of game played, and in-game behavior.

According to some examples, the method includes generating a notification that includes one or more recommendations regarding gameplay control options based on the extracted patterns indicating that one or more of the selected conditions are met by the activity data at step 420. For example, the pattern server 170 and/or the notification server 180 illustrated in FIGS. 1 and 2 may generate a notification that includes one or more recommendations regarding gameplay control options based on the extracted patterns indicating that one or more of the selected conditions are met by the activity data. In some examples, the selected conditions include a schedule or calendar designated by a supervisory user account, and further comprising toggling between different gameplay control modes for the user account based on the designated schedule or calendar.

According to some examples, the method includes sending the notification including the recommendations regarding the gameplay control options to a user device associated with a supervisory user account. For example, the platform server 120 illustrated in FIG. 1 may send the notification including the recommendations regarding the gameplay control options to a user device associated with a supervisory user account. In some examples, notifications, recommendations, and the gameplay control options may be accessible via a mobile application (e.g., Playstation® App) of the user device. In some examples, the gameplay control options include at least one of throttling game time, requiring activity diversification, or flagging in-game behaviors that meet the selected conditions. In some examples, the selected conditions include a schedule or calendar designated by a supervisory user account, and further comprising toggling between different gameplay control modes for the user account based on the designated schedule or calendar.

In some examples, the supervisory user account opts to implement a gameplay control option to require activity diversification. Consequently, the method may include blocking the user account from engaging in a current activity for a predetermined period of time. For example, the pattern server 170 illustrated in FIGS. 1 and 2 may block the user account from engage in a current activity for a predetermined period of time. Further, the method may include suggesting one or more alternative activities that are currently available to the user account. For example, the pattern server 170 illustrated in FIGS. 1 and 2 may suggest one or more alternative activities that are currently available to the user account.

According to some examples, the method includes recording media segments of gameplay by the user account based on one or more timestamps associated with the activity data that met the selected conditions. For example, the content recorder 202 using the content ring-buffer 208 that generates the media file 212 and the content time stamp file 214 as illustrated in FIG. 2 may generate the recorded media segments of gameplay by the user account based on one or more timestamps associated with the activity data that met the selected conditions.

According to some examples, the method includes providing the recorded media segments to a supervisory user account. For example, the pattern server 170 illustrated in FIGS. 1 and 2 may provide the recorded media segments to a supervisory user account.

Figure 5:
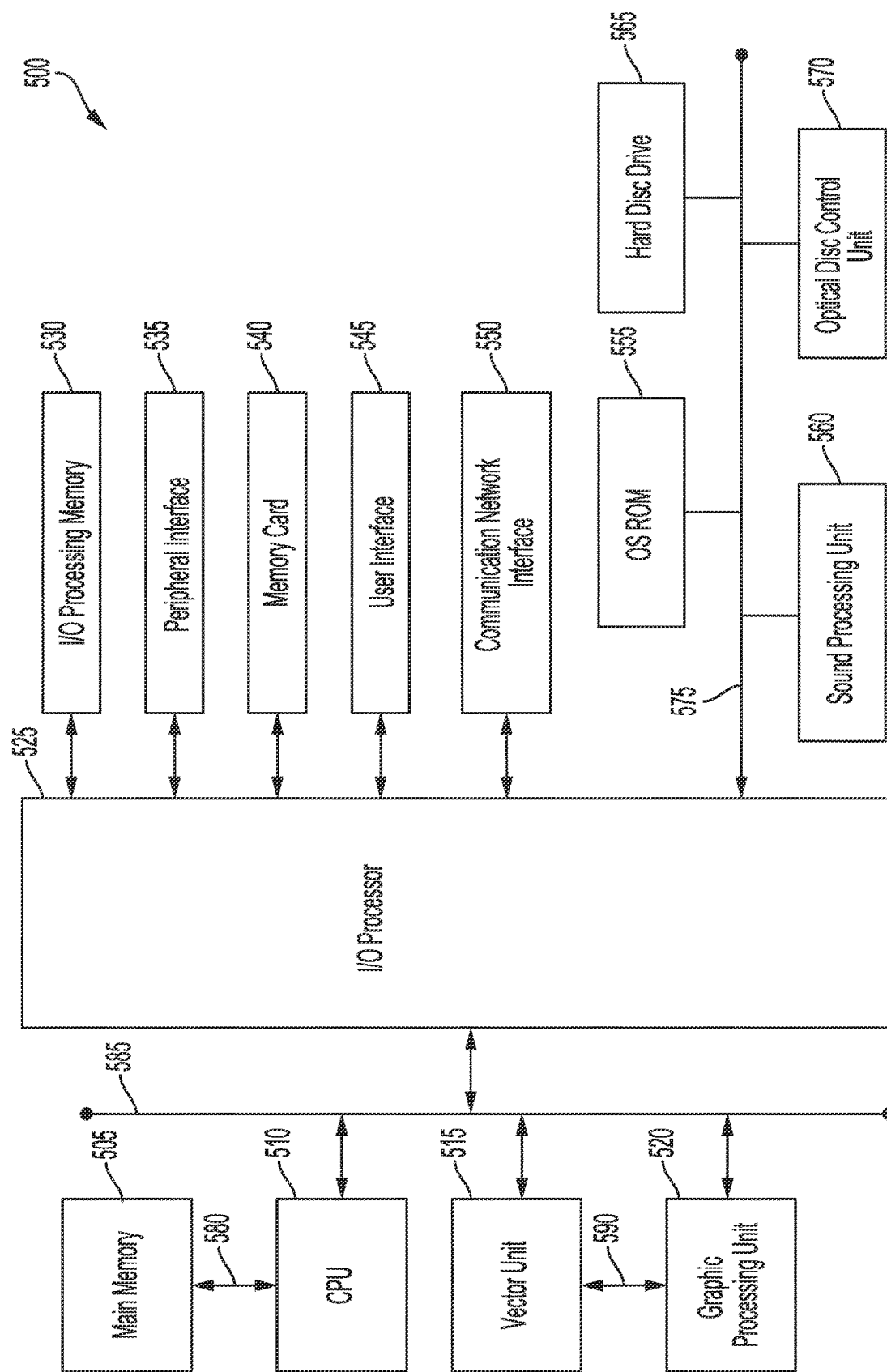
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct an avatar in a game to perform some specified action.

The present disclosure pertains to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for developing and customizing learning models regarding gameplay, the method comprising:
   storing information in memory regarding a user account and one or more selected conditions;
   monitoring activity data from a plurality of gameplay sessions of a plurality of interactive content titles, the activity data associated with the user account;
   analyzing the activity data to extract one or more gameplay patterns exhibited by the user account associated with the selected conditions, wherein analyzing the activity data is based on one or more learning models associated with the selected conditions, wherein at least one of the learning model is associated with the user account;
   generating a notification that includes one or more gameplay control options based on the learning models associated with the extracted patterns indicating that one or more of the selected conditions are met by the activity data; and
   refining the at least one learning model based on one or more selected gameplay control options and one or more outcomes of each gameplay control option.

2. The method of claim 1, wherein the one or more learning models pertain to player behavior that includes bullying or harassing language.

3. The method of claim 1, wherein the extracted gameplay patterns are associated with at least one of gameplay session length, type of game played, and in-game behavior.

4. The method of claim 1, further comprising sending the notification to a user device associated with a supervisory user account, wherein the gameplay control options are selectable via a mobile application of the user device.

5. The method of claim 1, wherein the gameplay control options include at least one of throttling game time, requiring activity diversification, or flagging in-game behaviors that meet the selected conditions.

6. The method of claim 1, wherein the selected conditions include a schedule or calendar designated by a supervisory user account, and further comprising toggling between different gameplay control modes for the user account based on the designated schedule or calendar.

7. The method of claim 1, further comprising:
   recording media segments of gameplay by the user account based on one or more timestamps associated with the activity data that met the selected conditions; and
   providing the recorded media segments to a supervisory user account.

8. The method of claim 7, wherein the supervisory user account opts to implement a gameplay control option to require activity diversification, and further comprising:
   blocking the user account from engaging in a current activity for a predetermined period of time; and
   suggesting one or more alternative activities that are currently available to the user account.

9. The method of claim 1, further comprising customizing the at least one learning model based on the extracted patterns.

10. A system for developing and customizing learning models regarding gameplay, the system comprising:
    memory that stores information regarding a user account and one or more selected conditions;
    a communication interface that receives activity data sent over a communication network from a plurality of gameplay sessions of a plurality of interactive content titles, the activity data associated with the user account; and
    a processor that executes instructions stored in memory, wherein the processor executes the instructions to:
    monitor the activity data;
    analyze the activity data to extract one or more gameplay patterns exhibited by the user account associated with the selected conditions, wherein analyzing the activity data is based on one or more learning models associated with the selected conditions, wherein at least one of the learning model is associated with the user account;
    generate a notification that includes one or more gameplay control options based on the learning models associated with the extracted patterns indicating that one or more of the selected conditions are met by the activity data; and
    refine the at least one learning model based on one or more selected gameplay control options and one or more outcomes of each gameplay control option.

11. The system of claim 10, wherein the one or more learning models pertain to player behavior that includes bullying or harassing language.

12. The system of claim 10, wherein the extracted patterns are associated with at least one of gameplay session length, type of game played, and in-game behavior.

13. The system of claim 10, wherein the communication interface further sends the notification over the communication network to a user device associated with a supervisory user account, wherein the gameplay control options are selectable via a mobile application of the user device.

14. The system of claim 10, wherein the gameplay control options includes at least one of throttling game time, requiring activity diversification, or flagging in-game behaviors that meet the selected conditions.

15. The system of claim 10, wherein the selected conditions include a schedule or calendar designated by a supervisory user account, and further comprising toggling between different gameplay control modes for the user account based on the designated schedule or calendar.

16. The system of claim 10, wherein the processor executes further instructions to:
   record media segments of gameplay by the user account based on one or more timestamps associated with the activity data that met the selected conditions; and
   provide the recorded media segments to a supervisory user account.

17. The system of claim 16, wherein the supervisory user account opts to implement a gameplay control option to require activity diversification, and wherein the processor executes further instructions to:
   block the user account from engage in a current activity for a predetermined period of time; and
   suggest one or more alternative activities that are currently available to the user account.

18. The system of claim 10, wherein the processor executes further instructions to customize the at least one learning model based on the extracted patterns.

19. A non-transitory computer-readable medium comprising instructions, the instructions, when executed by a computing system, cause the computing system to:
   storing information in memory regarding a user account and one or more selected conditions;
   monitoring activity data from a plurality of gameplay sessions of a plurality of interactive content titles, the activity data associated with the user account;
   analyzing the activity data to extract one or more gameplay patterns exhibited by the user account associated with the selected conditions, wherein analyzing the activity data is based on one or more learning models associated with the selected conditions, wherein at least one of the learning model is associated with the user account;
   generating a notification that includes one or more gameplay control options based on the learning models associated with the extracted patterns indicating that one or more of the selected conditions are met by the activity data; and
   refining the at least one learning model based on one or more selected gameplay control options and one or more outcomes of each gameplay control option.

* * * * *